United States Patent [19]

Roe

[11] 4,136,936
[45] Jan. 30, 1979

[54] APPARATUS FOR EDITING MOTION PICTURE AND SOUND FILM

[76] Inventor: Gerald Roe, 8211 Fourth Ave., North Bergen, N.J. 07047

[21] Appl. No.: 779,073

[22] Filed: Mar. 18, 1977

[51] Int. Cl.² .............................................. G03B 21/00
[52] U.S. Cl. ........................................ 352/129; 352/12
[58] Field of Search ............................. 352/12, 17, 129

[56] References Cited

U.S. PATENT DOCUMENTS

| 3,602,606 | 8/1971 | Rigby | 352/129 |
|---|---|---|---|
| 3,656,843 | 4/1972 | Misch | 352/129 |
| 3,743,397 | 7/1973 | Soul | 352/129 |
| 3,751,142 | 8/1973 | Roller | 352/129 |
| 3,771,860 | 11/1973 | Stone et al. | 352/129 |
| 3,856,389 | 12/1974 | Gardner | 352/129 |
| 3,912,383 | 10/1975 | Stuz | 352/129 |
| 3,995,946 | 12/1976 | Greenberg | 352/129 |

OTHER PUBLICATIONS

"Filmin Editing Bench", *Super 8 Filmmaker*, vol. 3, No. 6, Nov./Dec. 1975, p. 25.

*Primary Examiner*—Russell E. Adams
*Attorney, Agent, or Firm*—Donald R. Heiner

[57] ABSTRACT

A post production facility comprising apparatus for editing motion picture film and sound film and performing additional functions of sound mixing, displacing, etc. wherein the apparatus may perform all the functions normally associated with film editing and the physical arrangement of the film and sound tape are parallel and adjacent to each other to simplify the editing process. The apparatus comprises an upright console containing four motion picture reels, a plurality of idler pulleys, an editing module, a series of tension pulleys and a drive sprocket. The console control section is disposed at the bottom of the facility and is substantially perpendicular to the upright portion for ease of operation and contains substantially all the controls. An intermediate section is disposed at a 45° angle to the upright console and houses a viewing screen and splicer mount.

5 Claims, 3 Drawing Figures

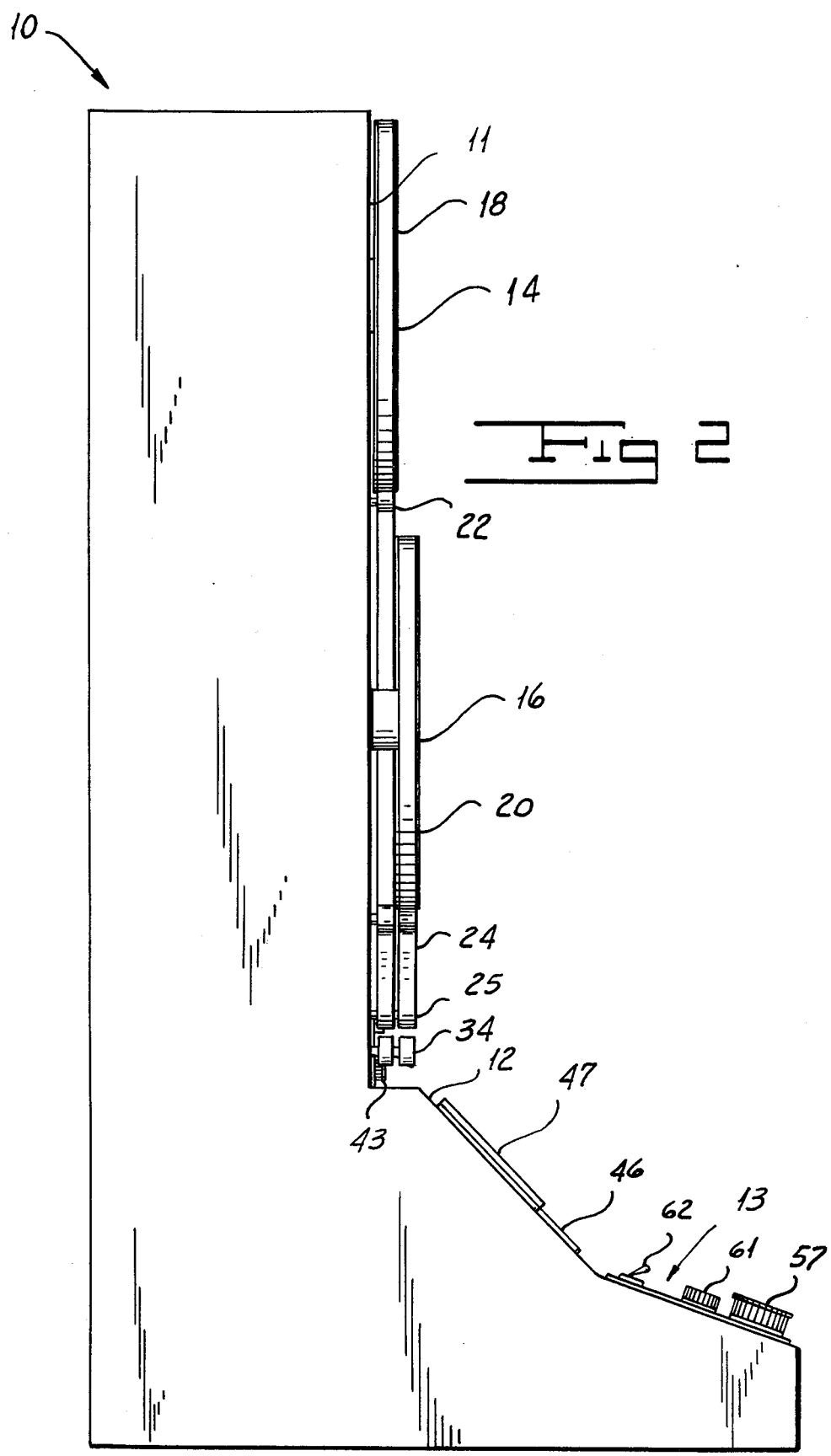

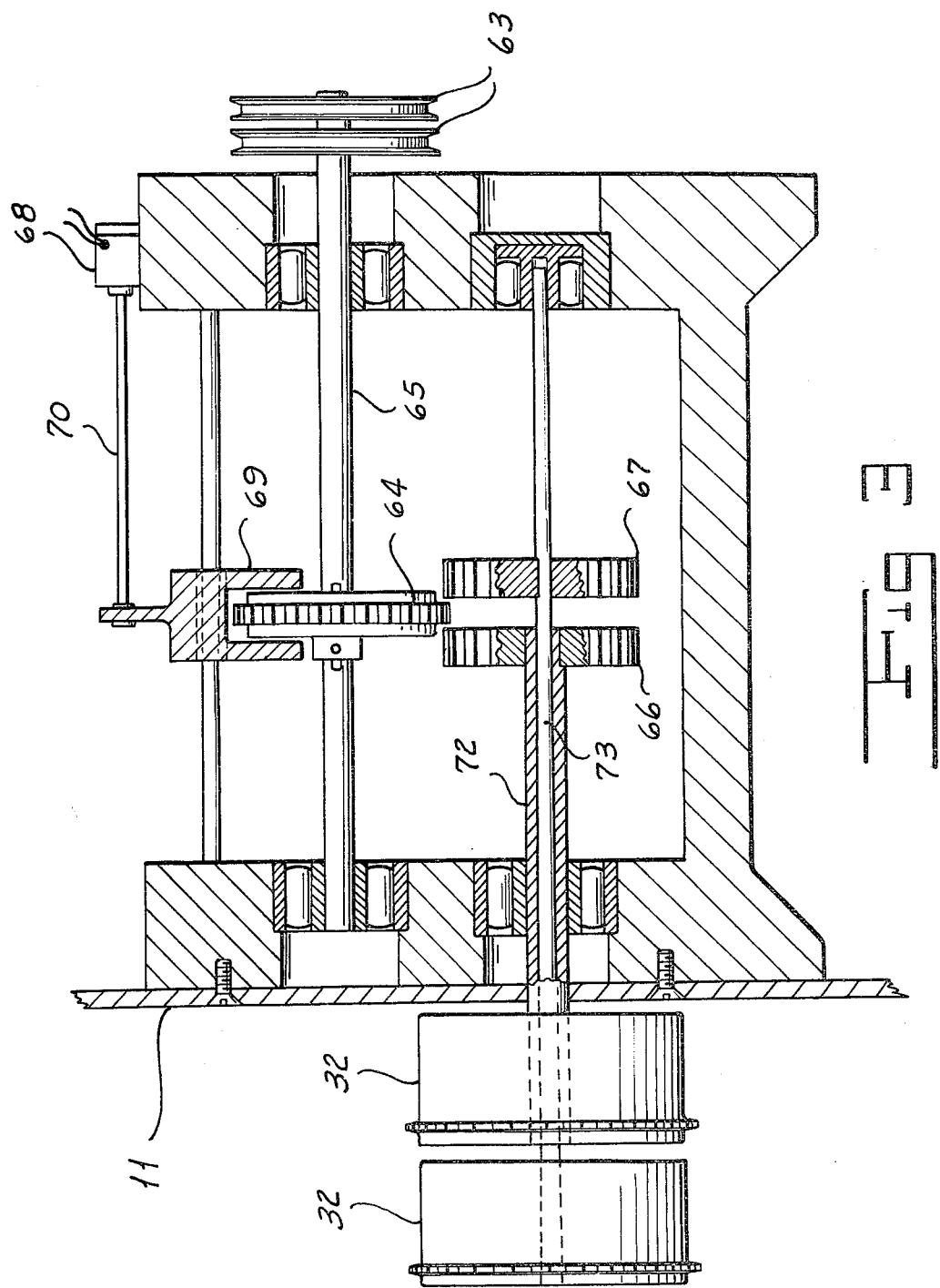

APPARATUS FOR EDITING MOTION PICTURE AND SOUND FILM

BACKGROUND OF THE INVENTION

The present invention relates generally to the field of editing motion picture film and sound film and performing additional functions of sound mixing and displacing, etc. and more particularly to a post film production facility comprising a console containing four motion picture reels which allows a film editor complete and easy accessibility to all the functions and techniques required in post film production. The post production facility allows an editor to run sound and picture together in synchronization for editing purposes, and the editor can edit up to four tracks of sound such as voice, music, background noise, etc. and then mix these sound tracks onto an edited film. Further, the editor can erase any track independently of the others if a correction or change is to be made. The facility can perform the functions, known in the arts as "resolving", "mixing", "editing", "transferring", and "sound displacing".

The post production facility comprises essentially an upright console containing four motion picture reels. The console has a substantially vertical portion which contains the reels, idler pulleys, editing module, tension pulleys and drive sprocket; a lower portion which extends out at approximately 45° from the vertical portion and which contains a splicer mount and viewing screen; and, a base portion substantially perpendicular to the vertical portion and which contains substantially all of the controls. The controls disposed in the base portion comprise essentially a variable speed control, direction control, a selection switch which allows the device to run at variable speed or to be slaved to an internal or external reference signal for film speed, a resolver input switch for accepting high and low sync signals in order to slave the console to an external reference signal, a power on-off switch, record and playback switches, slide volume controls, a master volume control, a monitor switch for selecting either speaker or head phones, a tension keylock erase switch for simultaneously activating a flasher and warning beeper, and erase circuit, and a plurality of track erasing selector switches.

PRIOR ART

The most pertinent prior art patents uncovered during the search appear to be the patents to Harris, U.S. Pat. No. 3,740,125; Lawson, U.S. Pat. No. 3,801,191; Kemna, U.S. Pat. No. 2,297,222; and Browder, U.S. Pat. No. 2,813,453.

The patent to Harris, U.S. Pat. No. 3,740,125, discloses a motion picture sound processing apparatus having editing, synchronization and sound mixing capabilities where the apparatus is contained in a basic editing table. The instant invention varies considerably from the Harris patent in that the instant invention provides a vertical console containing four reels; a viewing screen and splicer mount portion angled out at approximately 45° from the vertical portion for ease of viewing and splicing; and a base portion substantially perpendicular to the vertical portion and containing all the controls necessary for editing, resolving, transferring and mixing. The control console in the Harris patent is a horizontal table which contains only a motion picture film tape, one tape deck, a viewing apparatus and a programmer.

The patent to Lawson relates to a tape and film editing means having a film viewing screen and projector lens and also having a film feeding, a film take-up reel and a tape feeding and tape take-up reel. However, again, as explained above, this patent does not provide the substantially vertical console of the instant invention containing four reels, side by side, and top and bottom, with the bottom two reels staggered out from the top two reels to allow for parallel running of the film and sound tapes. Further, the patent to Lawson does not teach the controls for resolving, transferring and mixing sound on to an edited film as does the instant invention.

The patent to Kemna does relate to a film inspection table for examining a picture film and its accompanying sound film to determine synchronism and for providing for the editing of the film and final cutting of the sound film and/or picture film on the table. It does not teach the vertical alignment and staggered top to bottom relationship of the picture and sound films and does not teach the controls of the instant invention for editing, resolving, transferring and mixing of the instant invention.

The patent to Browder discloses a film editing machine having the two feed reels and two take-up reels for the picture film and sound film as in the instant invention and contains the projection screen and loudspeaker of the instant invention. The configuration of the vertical console and the 45° angled out section containing the splicer mount and viewing screen and the base portion containing all the controls for editing, resolving, transferring and mixing distinguish the instant invention from the Browder patent.

SUMMARY OF THE INVENTION

Briefly, the invention relates to a console comprising all the elements necessary for editing a motion picture film and then resolving, transferring, and mixing sound on to the edited film to produce a perfectly synchronized finished product. An editor, using the console, can edit up to four tracks of sound such as voice, music, background noise, etc., and then mix these four tracks on to an edited film. The editor will be able to adjust synchronization during any editing or sound transfer process while the film is in motion and would be able to erase any sound track independently of the other three if necessary.

The console comprises a base portion containing nearly all the controls for performing the functions indicated above, a substantially vertical portion containing four reels, idler pulleys, an editing module, tension pulleys, and a drive sprocket, and; an intermediate portion disposed between the base and vertical portion and angled out at approximately 45° from the vertical portion and which contains a splicer mount and viewing screen.

Accordingly, it is an object of the invention to provide a compact, portable, motion picture editing and sound synchronization console.

Another object of the invention is to provide a motion picture editing and sound synchronization console wherein the picture film and sound tape run parallel to each other for extreme ease in the editing process.

Another object of the invention is to combine all the past motion picture production facilities into one console.

Another object of the invention is to provide a motion picture editing and sound synchronization console which has the ability to correct the synchronization between picture and sound while the tapes are in motion.

Another object of the invention is to provide a motion picture editing and sound synchronization console further comprising a film splicer mounted directly in line with the film to be edited.

Still another object of the invention is to provide a motion picture editing and sound synchronization console wherein an editor can edit up to four tracks of sound and then mix these sound tracks on to an edited film.

Still another object of the invention is to provide a motion picture editing and sound synchronization console wherein an editor can erase one sound track independently of the other.

Still another object of the invention is to provide a motion picture editing and sound synchronization console wherein an editor can edit, resolve, mix, transfer and displace sound.

These and other objects and advantages of the invention are believed made clear by the following description thereof taken in conjunction with the accompanying drawings wherein;

IN THE DRAWINGS

FIG. 2 is a side view of the console showing the vertical portion, intermediate portion, and lower portion containing the controls and showing the staggered relationship of the reels.

FIG. 3 is a side sectional view of the film drive assembly taken on line 3—3 of FIG. 1.

Figure 1:
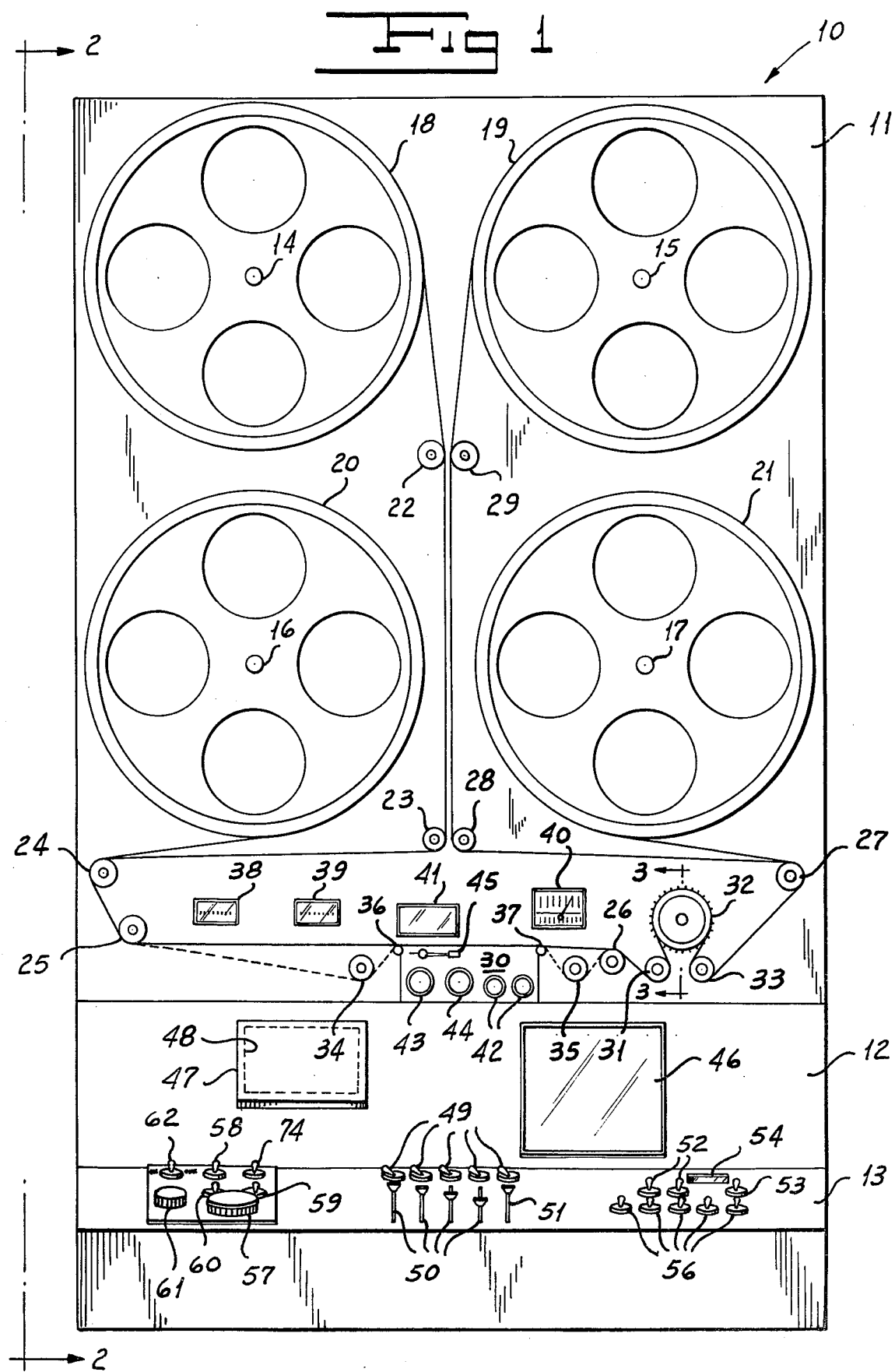
FIG. 1 is a front view of the console showing the vertical portion, intermediate portion, and lower portion containing the controls.

Referring now to the drawings, there is shown in FIGS. 1 and 2 the basic console or apparatus for editing motion picture and sound film shown at 10 and comprising a vertical reel carrying panel 11, a viewing screen and splicer mount carrying panel 12 angled out at approximately 45° to the vertical panel, and a base portion 13 substantially perpendicular to the vertical panel for housing all the controls necessary for post motion picture production editing and sound synchronization functions.

The vertical reel carrying panel 11 has four rotatable reel receiving shafts 14, 15, 16, and 17 for carrying four reels of picture and sound film such as shown at 18, 19, 20 and 21 for purposes to be more fully described below. As can be seen in FIG. 2, lower reels 20 and 21 project out or away from the vertical panel 11 a greater distance than the upper reels 18 and 19 to allow the top and bottom films to run side by side in a parallel relationship in the film editing and sound transferring process as will be more fully explained. Also mounted on vertical panel 11 are eight idler pulleys 22, 23, 24, 25, 26, 27, 28 and 29 (24, 25, 26, and 27 are double or tandem type pulleys) around which the sound and picture films travel from the feed reels to the take-up reels as the films travel through a sound picture editing module shown generally at 30. It should be understood that the feed reels are 18 and 20 and the take-up reels are designated as 19 and 21 as shown in FIG. 1. After the films travel through the sound picture editing module 30 and before being wound on to take-up reels 19 and 21, they pass one tension pulley 31, drive sprockets 32 (one shown) and tension pulley 33. The films can take an alternate path (shown by dotted lines), for sound transferring and mixing, over fly wheel roller 34 and 35 and guide pulleys 36 and 37 for added sound stability again as will be more fully described below.

This vertical panel 11 further houses electronic digital frame and footage read out units 38 and 39 and a volume unit meter 40 for visually monitoring sound being recorded.

The sound picture editing module 30 comprises a movable lamphouse 41 and guides for the film, tape heads and an optical viewing system all of which are enclosed within the console, are well known in the art, are not necessary for an understanding of the invention and are therefore not shown.

Also mounted on vertical panel 11, and forming part of sound picture editing module 30, are control knobs 42 for moving the tape heads (not shown) relative to both the edited sound track and magnetic stripe on the film for purposes of correcting sound out of synchronization as the tape travels through the sound picture editing module 30. Focusing of the optical system (not shown) is accomplished by means of control knob 43, picture intensity is controlled by knob 44 and the lamphouse 41 can be shifted away from the picture area being edited by means of control lever 45, all of which are mounted on vertical panel 11 of console 10 for ease of operation.

The intermediate panel 12, which is angled out at approximately 45° to the vertical panel 11, houses a viewing screen 46 for displaying the picture to be edited and a removable splicer mount 47 which exposes an access door 48 (shown in dotted lines) when the splicer mount is removed. Access door 48 functions to cover audio inputs and outputs for four sound tracks and one film track contained in console 10.

The base portion 13 of console 10 is substantially perpendicular to vertical panel 11 and houses all the controls necessary for post motion picture production editing and sound synchronization functions. These controls comprise a plurality of record and playback switches 49 for all the sound tracks and a plurality of slide volume controls 50, one for each sound track. In addition, a master slide volume control 51 is provided to override all the tracks being recorded.

Two sound monitor controls 52 are provided. One can select either speaker or headphones, and the other is a volume control for the one selected. An erase section is also housed in base portion 13 and comprises a tension keylock switch 53, which simultaneously will activate a warning flasher 54 and warning beeper 55, and an erase circuit and a plurality of switches 56 for selecting the particular track to be erased. In addition to the above, base portion 13 houses a variable speed control 57 for adjusting the speed of the film as it winds from the feed reels to the take-up reels through the sound picture editing module, a direction control switch 58 for selecting the direction of film travel, a selection switch 59 which will allow the console to run either at variable speed or to be slaved to either an internal or external reference signal for film speed, a resolver input switch 60 for accepting high and low sync signals in order to slave the console to an external reference signal and, an input jack 61 for connecting the console 10 to a recorder (not shown) containing the original sound to be transferred. On-off switch 62 is also mounted on base portion 13 for turning the console 10 on or off. This switch 62 is accompanied by a power on indicator light and panel mounted fuses, neither of which are shown. In addition, a switch 74 is provided for selecting either internal or external synchronization.

Referring now to FIG. 3, there is shown a film drive assembly for turning drive sprockets 32 and thereby causing the film to over in either direction determined by the position of direction control switch 58. This assembly allows the film drive sprockets 32 to be driven either independently or together. A power source, such as an electric motor (not shown), turns pulleys 63 by means of a drive source such as a belt (not shown), and the pulleys 63 in turn drive gear 64 through its connection to a shaft 65. Gear 64 is keyed to shaft 65 and can slide either left or right, to mesh with either gear 66 or 67, by means of a solenoid 68 and shifter fork 69 operatively associated with each other through means of a connecting rod 70. With the solenoid 68 in an off position, gear 64 is centered and drives both gears 66 and 67. Gear 66, when driven, drives inner sprocket 32 through a hollow shaft 72 keyed to inner sprocket 32 and gear 67 when driver drives outer sprocket 32 through a solid shaft 73 keyed to outer sprocket 32. Thus, this assembly will allow either of the two films, in parallel relationship to each other, while travelling from one set of reels to another set of reels, to be driven independently of the other or will allow both to travel simultaneously.

In summary, what has been described above, is a compact, light weight, portable console containing all the apparatus and controls necessary for editing motion picture and sound film and performing the additional functions of resolving, mixing, transferring and displacing sound. The console comprises three interconnected sections: a vertical section housing the reels to be edited along with film drive and guide means and a sound picture editing module, lamphouse, volume unit meter and electronic digital read outs for frames and footage; a second section angled at approximately 45° to the vertical section and having a splicer mount and viewing screen; and, a third or base section substantially perpendicular to the vertical section which houses all the controls except those already mentioned.

OPERATION

In operation, and to start the film editing and sound resolving process, a blank sound tape is placed on the lower left hand shaft 16 and switch 62 is turned to the on position. An outside sound recorder (output) is plugged into the console input jack 61 and selection switch 59 is turned to the external slave position shown on the console for controlling the film speed. The blank sound tape will start rotating when it receives a pulse or signal from the outside sound recorder (output). The blank sound tape will travel off the feed reel 20, over idler pulleys 24 and 25, and into the sound picture editing module 30 where the sound is transferred from the outside sound recorder to the blank tape via means of the movable tape head. The outside sound recorder is a two track tape: One track has the sound to be transferred, and the other has the pulse signal or sine wave signal whose function it is to align the perforation on the sound tape with the pulse signal from the outside recorder at a given reference point. This pulse signal or sine wave signals the control unit to slow up or speed up the blank sound tape. After the sound is transferred to the blank sound tape, the tape travels over idler pulley 26, tension pulley 31, drive sprocket 32, tension pulley 33, idler pulley 27, and on to take up reel 21. The direction of tape travel is the reversed and the tape, now with sound on it, is re-wound on to reel 20.

The sound tape is now transferred to the upper left shaft 14 and an original motion picture film to be edited is placed on the lower left shaft 16. The sound film contains a tone or clapping noise which can then be aligned with a visual signal on the motion picture film which will achieve a synchronized sound-picture relationship.

Selection switch 59 is turned to the slave internal or variable speed mode and the top and bottom reels 18 and 20 rotate and the tapes run over idler pulleys 22 and 23, meet in a parallel relationship at idler pulley 24, travel over idler pulley 25 in a parallel, side-by-side relationship, and into sound picture editing module 30. At this point, the image of the motion picture film can be seen on viewing screen 46 and the sound from the sound tape can be heard simultaneously through the speaker or headphones determined by the position of sound monitor control 52. Lamphouse 41 is on at this time allowing the editor to view the picture at 46.

The picture and sound films run parallel to each other in a side-by-side relationship and cutting marks are placed on both films as they run onto take-up reels 19 and 21. Again, as described above, the direction of tape travel is reversed and the tapes are re-wound on to reels 18 and 20.

Both films, properly marked, are re-run in the forward direction, at the editing speed. The films are stopped at the points to be cut out or edited, the cuts are made, and the tapes continue to run on to take-up reels 19 and 21. The films containing the sound and picture to be used are now on the take-up reels 19 and 21 and these reels are removed and replaced by blank reels. The film that has to be cut out or removed is wound on to the blank reels. Those reels are now removed, the reels to be used are reinserted onto the console and run together and scenes are now properly spliced together. The sound and motion picture films have now been resolved and edited.

A new blank sound tape is again placed on the lower left hand shaft 16 and the outside sound recorder (output) is again plugged into the console input jack 61 and selection switch 59 is turned to the internal synchronization mode. The outside sound recorder will contain music, or background noise, or narration, etc. and the same process as in the first sound resolving process is followed. The properly recorded sound tape is again transferred to the upper left shaft 14 and the now edited motion picture tape reel is put on the lower left shaft 16 and both films again run together in a parallel, side-by-side relationship, as previously described, until the point where the sound is to be fed into the motion picture reel is seen on the viewing screen 46.

The process described above for the first and second sound reels are repeated until we have four reels of sound and one reel of edited motion picture film.

Each of the four sound reels are placed, one at a time, on the lower left shaft and transferred to the lower right take-up reel. A four track tape is placed on the upper left hand shaft and each of the four sound reels are alternately placed on the lower left hand shaft and the two tapes run parallel and sound is transferred from each of the sound tapes to one of the four sound tracks until we have four tracks of sound on one tape.

The edited motion picture reel is now placed on the lower left shaft and the four track sound tape is placed on the upper left shaft, selection switch 59 is turned to the internal slave mode, and the two tapes again run in a parallel, side-by-side relationship as previously described, and the sounds from the four tracks are mixed with a sound stripe on the motion picture film utilizing the slide volume controls 50 and master slide volume control 51.

It will be understood that the invention is not to be limited to the specific construction or arrangement of the parts shown and that they may be modified widely within the invention defined by the claims.

What is claimed is:

1. Apparatus for editing a motion picture tape and transferring a plurality of sound tracks thereon in frame for frame synchronization comprising:
   a. A vertical panel having four reel receiving shafts rotatably mounted therein in a side-by-side and top to bottom parallel spaced about relationship with each other wherein the bottom two shafts project out from said vertical panel a greater distance than the top two shafts;
   b. A tape reel rotateably mounted on each of said four reel receiving shafts;
   c. A plurality of idler pulleys mounted on said vertical panel for guiding the travel of tapes from reel to reel;
   c. A sound picture editing module mounted in said vertical panel through which the motion picture tape to be edited passes;
   e. A drive sprocket mounted on said vertical panel over which the tapes travel for driving said tape through said sound picture editing module in a parallel, side-by-side relationship;
   f. An intermediate panel cooperating with and extending below said vertical panel at an angle thereto and having a viewing screen mounted therein for viewing said motion picture tape; and;
   g. A base portion cooperating with and extending below said intermediate panel substantially perpendicular to said vertical panel for housing controls necessary for editing said motion picture tape and transferring said plurality of sound tracks thereon.

2. The apparatus of claim 1 wherein said vertical panal has a movable lamphouse disposed thereon for allowing an editor to view said motion picture tape on said viewing screen.

3. The apparatus of claim 2 wherein said lamphouse can be shifted away from the picture area being edited by means of a control lever mounted on said vertical panel.

4. The apparatus of claim 3 wherein said intermediate panel has a removable splicer mount disposed thereon for receiving a splicer for splicing said tapes.

5. The apparatus of claim 4 wherein an access door is disposed on said intermediate panel, behind said removable splicer mount, whereby said access door is exposed upon removal of said removable splicer mount said access door functioning to cover controls disposed in said vertical panel.

* * * * *